United States Patent
Calvin (10) Patent No.: US 10,988,679 B2
(45) Date of Patent: Apr. 27, 2021

(54) METHOD FOR PROPAGATING FRACTURES IN SUBTERRANEAN FORMATIONS USING STRESS TREATMENT CYCLES

(71) Applicant: HALLIBURTON ENERGY SERVICES, INC., Houston, TX (US)

(72) Inventor: James Eldon Calvin, Oklahoma City, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 241 days.

(21) Appl. No.: 16/328,425

(22) PCT Filed: Oct. 27, 2016

(86) PCT No.: PCT/US2016/059163
§ 371 (c)(1),
(2) Date: Feb. 26, 2019

(87) PCT Pub. No.: WO2018/080504
PCT Pub. Date: May 3, 2018

(65) Prior Publication Data
US 2021/0054262 A1    Feb. 25, 2021

(51) Int. Cl.
*E21B 43/26* (2006.01)
*C09K 8/80* (2006.01)
(Continued)

(52) U.S. Cl.
CPC .................. *C09K 8/80* (2013.01); *C09K 8/62* (2013.01); *C09K 8/92* (2013.01); *E21B 43/12* (2013.01); *E21B 43/26* (2013.01); *C09K 2208/08* (2013.01)

(58) Field of Classification Search
CPC ... C09K 8/80; C09K 8/62; C09K 8/92; C09K 2208/08; E21B 43/12; E21B 43/26
See application file for complete search history.

(56) References Cited

U.S. PATENT DOCUMENTS 8,668,011 B2    3/2014    Mack et al.
8,851,179 B2 *  10/2014   DeFosse ............... E21B 43/267
                                                166/308.2
(Continued)

FOREIGN PATENT DOCUMENTS

WO    2014193906 A1    12/2014

OTHER PUBLICATIONS

International Search Report and Written Opinion dated Jul. 25, 2017 for international patent application No. PCT/US2016/059163, filed on Oct. 27, 2016.
(Continued)

*Primary Examiner* — Silvana C Runyan
(74) *Attorney, Agent, or Firm* — Chamberlain Hrdlicka (57) ABSTRACT

Methods for fracturing subterranean formations include pumping a micro-proppant slurry into a wellbore located in the subterranean formation containing near field primary fractures and far field secondary fractures and sequentially increasing and decreasing flow rates of the micro-proppant slurry in the wellbore while propagating far field secondary fractures within the subterranean formation during two or more stress treatment cycles. Each stress treatment cycle includes increasing the flow rate of the micro-proppant slurry in the wellbore, then decreasing the flow rate of the micro-proppant slurry in the wellbore. The micro-proppant slurry includes a fracturing fluid and a micro-proppant having an average particle size of 150 micrometers or less.

20 Claims, 4 Drawing Sheets

(51) Int. Cl.
  *C09K 8/62* (2006.01)
  *C09K 8/92* (2006.01)
  *E21B 43/12* (2006.01)

(56) References Cited

U.S. PATENT DOCUMENTS

| | | |
|---|---|---|
| 9,103,200 B2 | 8/2015 | Baihly et al. |
| 9,297,245 B2 | 3/2016 | Stephenson et al. |
| 2011/0120713 A1* | 5/2011 | Todd .................... E21B 43/267 166/280.1 |
| 2015/0075778 A1 | 3/2015 | Walters et al. |
| 2016/0326859 A1* | 11/2016 | Crews ................. E21B 41/0035 |
| 2017/0158952 A1* | 6/2017 | Nguyen ................... C09K 8/80 |

OTHER PUBLICATIONS

SPE-174060-MS, 2015, Application of Micro-Proppant to Enhance Well Production in Unconventional Reservoirs: Laboratory and Field Results.

SPE-177663-MS, 2015, Application of Micro-Proppant in Liquids Rich, Unconventional Reservoirs to Improve Well Production: Laboratory Results, Field Results, and Numerical Simulations.

* cited by examiner

METHOD FOR PROPAGATING FRACTURES IN SUBTERRANEAN FORMATIONS USING STRESS TREATMENT CYCLES

BACKGROUND

This section is intended to provide relevant contextual information to facilitate a better understanding of the various aspects of the described embodiments. Accordingly, it should be understood that these statements are to be read in this light and not as admissions of prior art.

Hydraulic fracturing is a stimulation process to form high-conductivity communication with a large area of a subterranean formation. The stimulation process can increase hydrocarbon production from the subterranean formation, as well as the efficiency of such hydrocarbon production. Therefore, it will be appreciated that improvements are continually needed in the hydraulic fracturing of subterranean formations.

BRIEF DESCRIPTION OF THE DRAWINGS

For a detailed description of the embodiments of the invention, reference will now be made to the accompanying drawings in which.

DETAILED DESCRIPTION

Figure 1:
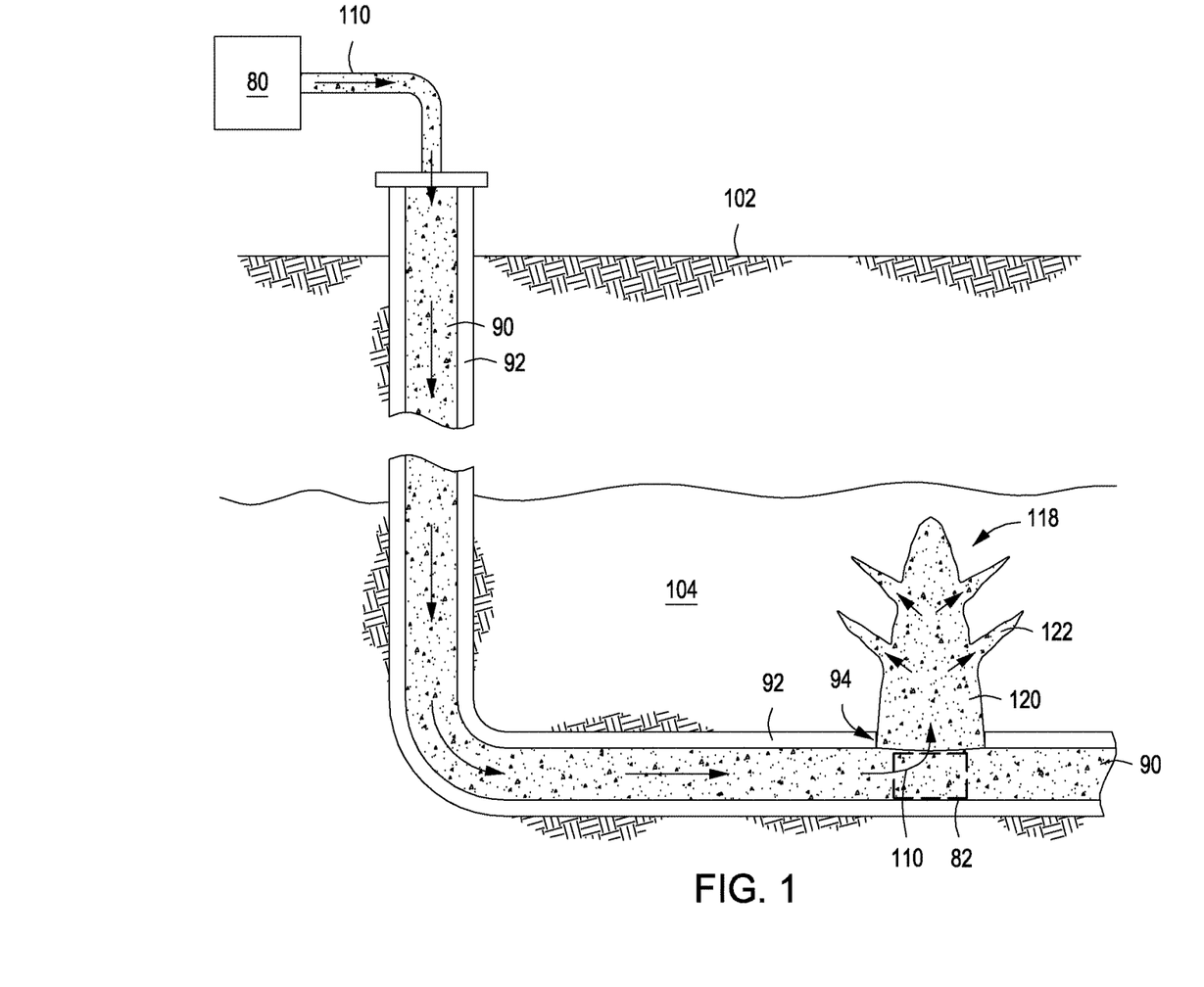
FIG. 1 depicts a schematic view of a wellbore located in the subterranean formation containing a micro-proppant slurry being introduced into a fracture system containing near field primary fractures and far field secondary fractures, according to one or more embodiments.

FIG. 1 depicts a schematic view of a wellbore 90 located in a subterranean formation 104. The wellbore 90 contains one or more casings 92 and the subterranean formation 104 can have one, two, or more fracture systems 118 located therein. The fracture systems 118 are in fluid communication with the wellbore 90 via one or more perforations 94 passing through the casing 92. Each fracture system 118 includes one or more near field primary fractures 120 and one or more far field secondary fractures 122.

The rock matrix of the subterranean formation 104 is of a type that when fractured, produces both of the near field primary fractures 120 and the far field secondary fractures 122. The far field secondary fractures 122 can have propagated from or near the ends and edges of the near field primary fracture 120. In certain instances, the subterranean formation 104 can be a low permeability zone having a permeability of 1 millidarcy (mD) or less. For example, the subterranean formation 104 can be or include shale. In certain instances, the rock matrix of the subterranean formation 104 can be or include cleating or natural fractures (e.g., those that existed prior to, and were not caused by, a fracture treatment). The natural fractures tend to run in one or more directions parallel to the near field primary fracture 120. The far field secondary fractures 122 may run in many directions including directions non-parallel and, in certain instances, perpendicular to the direction of the near field primary fracture 120. As a result, the far field secondary fracture 122 cross, and thereby link, the natural fractures to the near field primary fracture 120.

FIG. 1 shows a stimulation treatment system 80 that is used to pump, transfer, pressurize, or otherwise control one or more fracturing fluids, such as a micro-proppant slurry, into the subterranean formation 104, in accordance with one or more embodiments. The stimulation treatment system 80 includes one or more flow control devices 82 located within the wellbore 90, as shown, and/or located on a surface 102 of the subterranean formation 104 outside and adjacent to the wellbore 90, not shown. FIG. 1 depicts the stimulation treatment system 80 in fluid communication, adjacent to, or otherwise nearby the perforations 94 and/or of the fracture system 118 within the wellbore 90. A portion of the stimulation treatment system 80 can include, but is not limited to, one or more of: containers, mixers, pumps, control modules, and/or other devices and can be located on the surface 102. The flow control device 82 can be or include, but is not limited to, one or more valves (e.g., bypass valves), one or more ports, one or more regulators, or other tools or devices that control a flow of fluid into the subterranean formation 104 and/or into the fracture system 118.

An embodiment of a method for fracturing and stimulating a subterranean formation 104 includes pumping a micro-proppant slurry 110 into the wellbore 90 located in the subterranean formation 104 and sequentially increasing and decreasing flow rates of the micro-proppant slurry 110 in the wellbore 90 to perform one, two, or more stress treatment cycles. The subterranean formation 104 includes one or more fracture systems 118 containing one or more near field primary fractures 120 and one or more far field secondary fractures 122. The micro-proppant slurry 110 includes or contains a fracturing fluid and one or more types of micro-proppants that have an average particle size of 150 μm or less. The stress treatment cycles propagate the far field secondary fractures 122 within the subterranean formation 104 and increase stimulation of the subterranean formation 104. Each of the stress treatment cycles includes increasing the flow rate of the micro-proppant slurry 110, then decreasing the flow rate of the micro-proppant slurry 110.

The stress treatment cycle can be repeated as needed to propagate the far field secondary fractures 122 and to increase production stimulation of the subterranean formation 104. The stress treatment cycle can be repeated or otherwise conducted multiple times, such as in a range from 2, 3, 4, 5, 6, 8, about 10, about 15, about 20, about 30, or about 50 times to about 60, about 80, about 100, about 150, about 200, about 250, about 300, or more times. In some examples, the stress treatment cycle is repeated or otherwise conducted in a range from at least 2 times to about 300 times, a range from at least 3 times to about 200 times, a range from at least 3 times to about 100 times, or a range from at least 5 times to about 50 times.

Hydraulic fracturing stimulation forms or produces primary fractures in the near field (e.g., the near field primary fracture 120) around the wellbore 90 and induced, dendritic fractures in the far field (e.g., far field secondary fractures 122). The dendritic fractures are generally formed at the tips and/or the edges of the primary fractures, and extend outwardly in a branching manner. The secondary, dendritic fractures extend transversely to the trajectory of the primary fractures and reach and link natural fractures both in and adjacent to the trajectory of the primary fractures. As such, the far field secondary fractures 122 reach a larger portion of the naturally occurring fracture network, and link the natural fractures back to the primary fractures 120 and to the wellbore 90.

The stress cycling technique (e.g., two or more stress treatment cycles) uses changes in treatment/pump rate during hydraulic fracturing to vary the stress/pressure being applied to the rock and/or portions of the subterranean formation 104. These pressure changes form a cycling expansion and contraction effect on the rock, which increases the likely hood of failure occurring due to fatigue in the subterranean formation 104. Shale, coal, and other low permeability formations, for example, formations having a permeability of approximately 1 mD or less, can fracture in this manner. The methods discussed and described herein can include propping the far field secondary fractures 122 or other induced, dendritic fractures and, in certain instances, the linked natural fractures, to potentially improve recovery from the formation. The far field secondary fractures 122 or other dendritic fractures can be substantially propped open with the micro-proppant.

In some examples, prior to pumping the micro-proppant slurry 110 into the wellbore 90, the method also includes pumping the fracturing fluid without the micro-proppant into the wellbore 90 and fracturing the subterranean formation 104 with the fracturing fluid to form the near field primary fractures 120 and/or the far field secondary fractures 122.

Figure 2A:
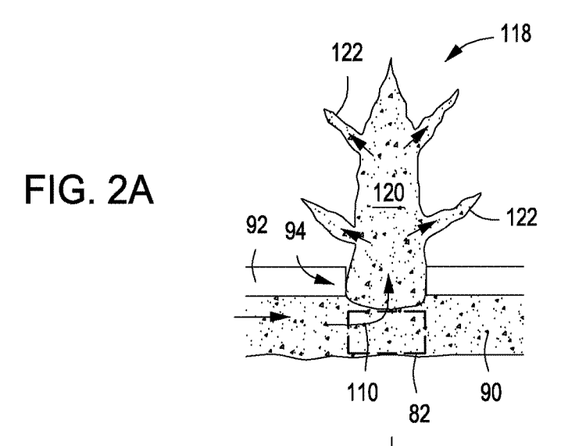
FIGS. 2A-2D depict schematic views of an exemplary fracture system containing near field primary fractures and far field secondary fractures at different intervals of a stress treatment cycle, according to one or more embodiments.

FIGS. 2A-2D depict schematic views of the fracture system 118 containing one or more near field primary fractures 120 and one or more far field secondary fractures 122 at different intervals of a stress treatment cycle, according to one or more embodiments. FIG. 2A depicts the fracture system 118 either prior to or at an initial or early stage of the stress treatment cycle. The micro-proppant slurry 110 flows through the optional flow control device 82, through the casing 90 via the perforation 94, and into at least the near field primary fracture 120 and also any existing far field secondary fractures 122, if any.

Figure 2B:
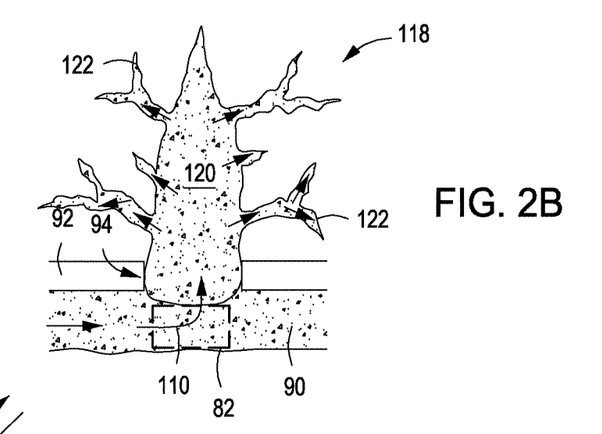
Figure 2C:
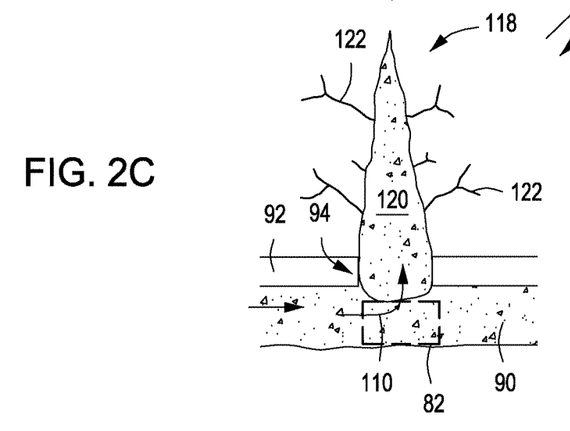
Figure 2D:
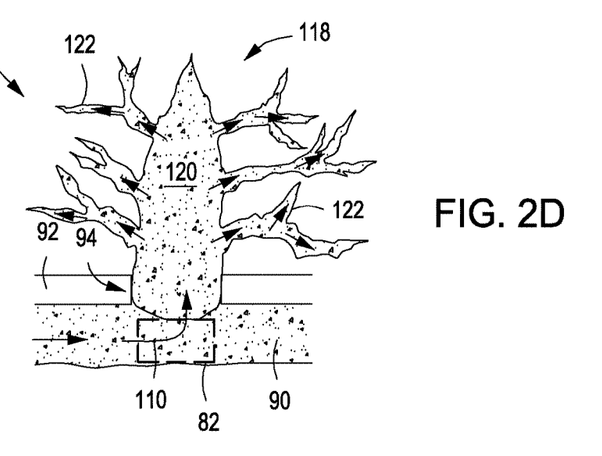

Each stress treatment cycle can include flowing the micro-proppant into the far field secondary fractures 122 when increasing the flow rate of the micro-proppant slurry 110, as depicted in FIG. 2B. Thereafter, each stress treatment cycle can include propping the far field secondary fractures 122 open with the micro-proppant when decreasing the flow rate of the micro-proppant slurry 110, as depicted in FIG. 2C. FIG. 2B depicts the propagation of the far field secondary fractures 122 due to an increased flow rate of the micro-proppant slurry 110 and FIG. 2C depicts the decreased size of the propped far field secondary fractures 122 due to an increased flow rate of the micro-proppant slurry 110. Each stress treatment cycle starts with an initial flow rate of the micro-proppant slurry 110 that is increased or decreased, hence, an increased flow rate or a decreased flow rate of the micro-proppant slurry 110.

For example, the flow rate of the micro-proppant slurry 110 can be increased which increases the down hole pressure in at least the near field primary fracture 120 and/or the far field secondary fractures 122. By propagating the far field secondary fractures 122, the increased flow rate increases the lengths of the far field secondary fractures 122, increases the sectional areas and/or the openings of the far field secondary fractures 122, and/or forms additional far field secondary fractures 122 within the subterranean formation 104, as depicted in FIG. 2B.

Also, the flow rate of the micro-proppant slurry 110 can be decreased which decreases the down hole pressure in at least the near field primary fracture 120 and/or the far field secondary fractures 122. In turn, the far field secondary fractures 122 reduces in size, such as sectional area and/or openings and length, and are propped open by the micro-proppant, as depicted in FIG. 2C.

By sequentially repeating the stress treatment cycle multiple times, additional far field secondary fractures 122 produces or otherwise forms in the fracture system 118. The subterranean formation 104 with the additionally formed far field secondary fractures 122 has increased stimulation and production due to the stress treatment cycle process.

Figure 3:
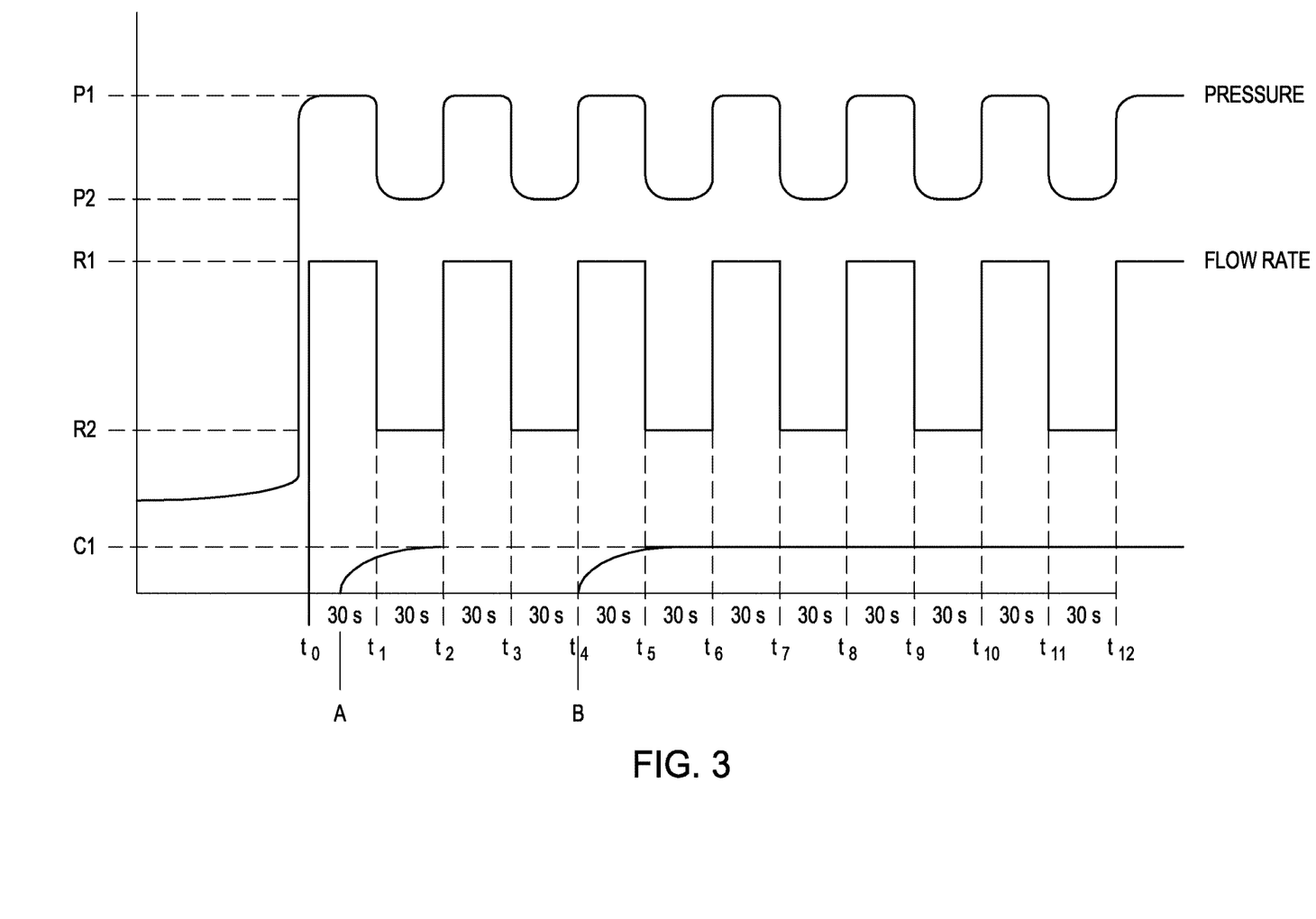
FIG. 3 depicts a diagram that plots several process conditions against time during an exemplary systematic rate change treatment, according to one or more embodiments.

FIG. 3 depicts a diagram that plots several process conditions against to time during an exemplary systematic rate change treatment, according to one or more embodiments. The process conditions include slurry flow rates (R1 and R2), bottom hole pressures (P1 and P2), and a micro-proppant concentration (C1) plotted against time ($t_0$-$t_{12}$). In one or more embodiments, the increased flow rate R1 and the decreased flow rate R2 of the micro-proppant slurry are equal or substantially equal to each other. For example, the increased flow rate R1 is maintained for about 30 seconds ($t_0$-$t_1$), then reduced to the decreased flow rate R2 that is maintained for about 30 seconds ($t_1$-$t_2$), then increased to the increased flow rate R1 that is maintained for about 30 seconds ($t_2$-$t_3$), and then reduced to the decreased flow rate R2 that is maintained for about 30 seconds ($t_3$-$t_4$). Thereafter, the flow rates R1 and R2 are sequentially increased and decreased and maintained at periods of equal or substantially equal to each other, as depicted in FIG. 3.

In other examples, not depicted in FIG. 3, the increased flow rate R1 and the decreased flow rate R2 of the micro-proppant slurry are maintained for unequal or substantially unequal period of time relative to each other, and the periods of time for each of the flow rates R1 and R2 can be sequentially repeated. For example, the flow rate R1 is maintained for a longer time than the flow rate R2, e.g., the flow rate R1 is maintained for about 30 seconds and the flow rate R2 is maintained for about 20 seconds. In other examples, the flow rate R1 is maintained for a shorter time than the flow rate R2, e.g., the flow rate R1 is maintained for about 20 seconds and the flow rate R2 is maintained for about 30 seconds.

The bottom hole pressures P1 and P2, the pressure applied to the formation, correlate respectively to the flow rates R1 and R2 during the periods of time ($t_0$-$t_{12}$). The increased flow rate R1 provides the increased pressure P1 at the same or substantially same period and the decreased flow rate R2 provides the decreased pressure P2 at the same or substantially same period.

The micro-proppant concentration C1 is the amount of the micro-proppant in an amount of the fracturing fluid. The concentration C1 of the micro-proppant is consistent or substantially consistent throughout the treatment process, as depicted in FIG. 3. Alternatively, not shown, the concentration C1 of the micro-proppant can be increased or decreased throughout different periods of time during the treatment process. As depicted in FIG. 3, the micro-proppant is added to the fracturing fluid and/or other downhole fluid at Point A (e.g., between $t_0$ and $t_1$) and is on the subterranean formation 104, such as in one or more near field primary fractures 120 and/or one or more far field secondary fractures 122 of the fracture system 118 at Point B (e.g., between $t_4$ and $t_5$).

Figure 4:
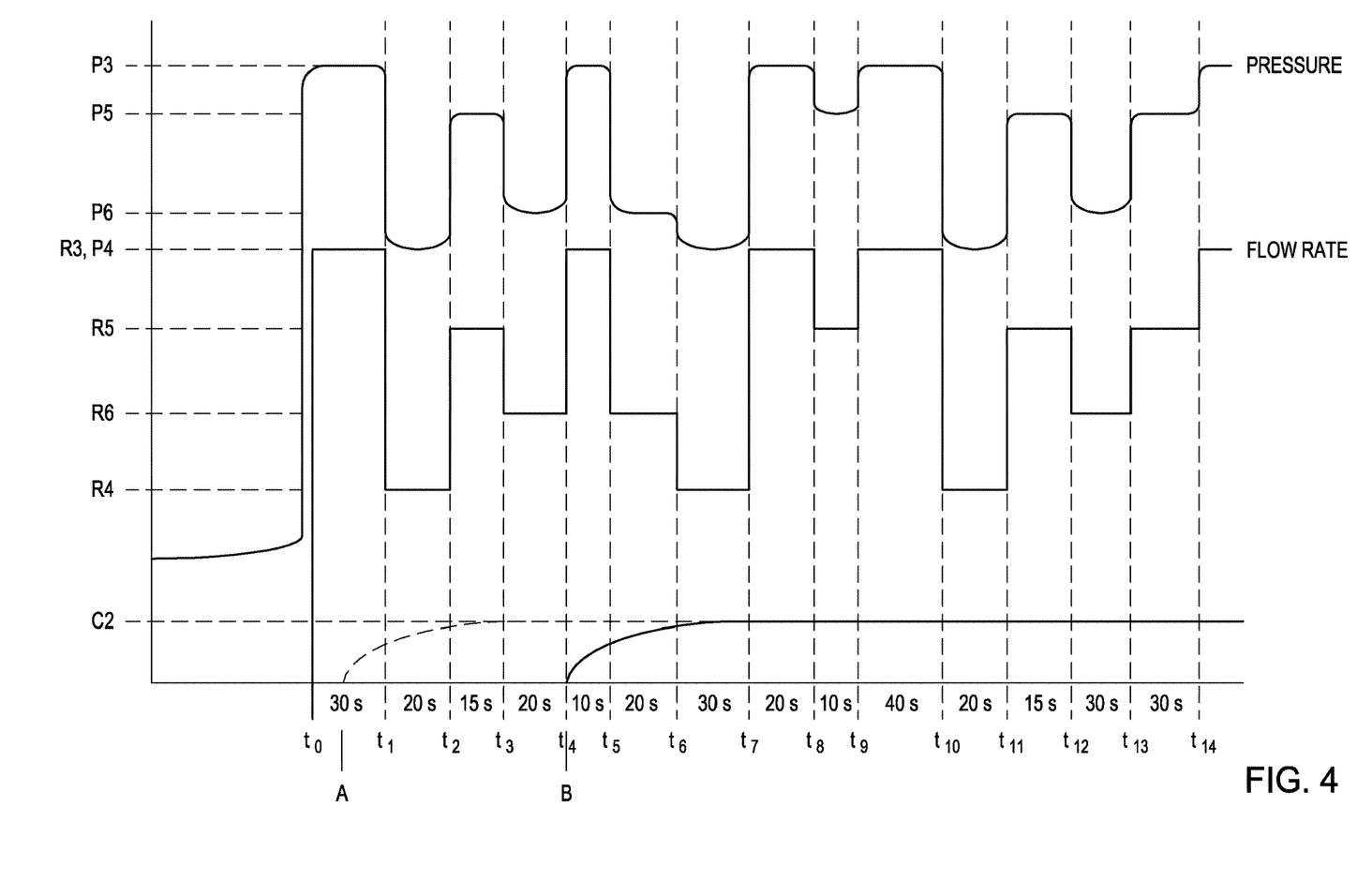
FIG. 4 depicts a diagram that plots several process conditions against time during an exemplary randomized rate change treatment, according to one or more embodiments.

FIG. 4 depicts a diagram that plots several process conditions against to time during an exemplary randomized rate change treatment, according to one or more embodiments. The process conditions include slurry flow rates (R3-R6), bottom hole pressures (P3-P6), and a micro-proppant concentration (C2) plotted against time ($t_0$-$t_{14}$). As depicted in FIG. 4 for the micro-proppant slurry, the increased flow rate R3 is greater than the increased flow rate R5 and the increased flow rates R3 and R5 are maintained for different periods of time. Also, the decreased flow rate R4 is less than the decreased flow rate R6 and the decreased flow rates R4 and R6 are maintained for different periods of time.

The randomized rate change treatment includes any permutation of flow rate, pressure, and time. For example, the increased flow rate R3 is maintained for about 30 seconds ($t_0$-$t_1$), then reduced to the decreased flow rate R4 that is maintained for about 20 seconds ($t_1$-$t_2$), then increased to the increased flow rate R5 that is maintained for about 15 seconds ($t_2$-$t_3$), and then reduced to the decreased flow rate R6 that is maintained for about 20 seconds ($t_3$-$t_4$), as depicted in FIG. 4. Thereafter, the flow rates R3-R6 are sequentially or randomly increased and/or decreased and maintained at periods of random time.

For example, from the decreased flow rate R6 at $t_3$-$t_4$, the increased flow rate R3 is maintained for about 10 seconds ($t_4$-$t_5$), then reduced to the decreased flow rate R6 that is maintained for about 20 seconds ($t_5$-$t_6$), then reduced to the decreased flow rate R4 that is maintained for about 30 seconds ($t_6$-$t_7$), then increased to the increased flow rate R3 that is maintained for about 20 seconds ($t_7$-$t_8$), then reduced to the decreased flow rate R5 that is maintained for about 10 seconds ($t_8$-$t_9$), then increased to the increased flow rate R3 that is maintained for about 40 seconds ($t_9$-$t_{10}$), then reduced to the decreased flow rate R4 that is maintained for about 20 seconds ($t_{10}$-$t_{11}$), then increased to the increased flow rate R5 that is maintained for about 15 seconds ($t_{11}$-$t_{12}$), then reduced to the decreased flow rate R6 that is maintained for about 30 seconds ($t_{12}$-$t_{13}$), and then increased to the increased flow rate R5 that is maintained for about 30 seconds ($t_{13}$-$t_{14}$), as further depicted in FIG. 4.

The bottom hole pressures P3, P4, P5, and P6, the pressure applied to the formation, correlate respectively to the flow rates R3, R4, R5, and R6 during the periods of time ($t_0$-$t_{14}$). The increased flow rate R3 provides the increased pressure P3 at the same or substantially same period, the decreased flow rate R4 provides the decreased pressure P4 at the same or substantially same period, the increased flow rate R5 provides the increased pressure P5 at the same or substantially same period, and the decreased flow rate R6 provides the decreased pressure P6 at the same or substantially same period.

The micro-proppant concentration C2 is the amount of the micro-proppant in an amount of the fracturing fluid. The concentration C2 of the micro-proppant is consistent or substantially consistent throughout the treatment process, as depicted in FIG. 4. Alternatively, not shown, the concentration C2 of the micro-proppant can be increased or decreased throughout different periods of time during the treatment process. As depicted in FIG. 4, the micro-proppant is added to the fracturing fluid and/or other downhole fluid at Point A (e.g., between $t_0$ and $t_1$) and is on the subterranean formation 104, such as in one or more near field primary fractures 120 and/or one or more far field secondary fractures 122 of the fracture system 118 at Point B (e.g., between $t_4$ and $t_7$).

The flow rate of the micro-proppant slurry 110 in the wellbore 90 and/or any part of the subterranean formation 104 is in a range from about 10 barrels per minute (bpm), about 20 bpm, about 30 bpm, about 40 bpm, about 50 bpm, about 60 bpm, about 70 bpm, about 80 bpm, about 90 bpm, or about 100 bpm to about 120 bpm, about 135 bpm, about 150 bpm, about 165 bpm, about 180 bpm, about 190 bpm, about 200 bpm, or greater. For example, the flow rate of the micro-proppant slurry 110 in the wellbore 90 and/or any part of the subterranean formation 104 is in a range from about 10 bpm to about 200 bpm, a range from about 20 bpm to about 100 bpm, a range from about 30 bpm to about 100 bpm, a range from about 30 bpm to about 90 bpm, a range from about 60 bpm to about 90 bpm, a range from about 50 bpm to about 90 bpm, a range from about 30 bpm to about 50 bpm, a range from about 30 bpm to about 60 bpm, or a range from about 30 bpm to about 70 bpm.

In one or more embodiments, the flow rate R1 is in a range from about 80 bpm to about 100 bpm and the flow rate R2 is in a range from about 50 bpm to about 70 bpm. In some examples, the flow rate R1 is in a range from about 85 bpm to about 95 bpm and the flow rate R2 is in a range from about 55 bpm to about 65 bpm. In other examples, the flow rate R1 is about 90 bpm and the flow rate R2 is about 60 bpm.

In other embodiments, the flow rate R3 is in a range from about 80 bpm to about 100 bpm, the flow rate R4 is in a range from about 20 bpm to about 40 bpm, the flow rate R5 is in a range from about 60 bpm to about 80 bpm, and the flow rate R6 is in a range from about 40 bpm to about 60 bpm. In some examples, the flow rate R3 is in a range from about 85 bpm to about 95 bpm, the flow rate R4 is in a range from about 25 bpm to about 35 bpm, the flow rate R5 is in a range from about 65 bpm to about 75 bpm, and the flow rate R6 is in a range from about 45 bpm to about 55 bpm. In other examples, the flow rate R3 is about 90 bpm, the flow rate R4 is about 30 bpm, the flow rate R5 is about 70 bpm, and the flow rate R6 is about 50 bpm.

One or more of the pressures of the wellbore 90 can include, but is not limited to, the bottom hole pressure, any of the pressures P1-P6, and other pressures discussed and described herein. The pressure of the wellbore 90 is in a range from about 500 pounds per square inch (psi), about 1,000 psi, about 2,000 psi, about 3,000 psi, about 4,000 psi, about 5,000 psi, about 6,000 psi, about 7,000 psi, or about 8,000 psi to about 9,000 psi, about 10,000 psi, about 11,000 psi, about 12,000 psi, about 13,000 psi, about 14,000 psi, about 15,000 psi, or greater. For example, the pressure of the wellbore 90, such as the bottom hole pressure, is in a range from about 500 psi to about 15,000 psi, a range from about 8,000 psi to about 12,000 psi, a range from about 5,000 psi to about 10,000 psi, a range from about 8,500 psi to about 11,000 psi, or a range from about 6,000 psi to about 12,000 psi.

In one or more embodiments, the pressure P1 is in a range from about 9,000 psi to about 11,000 psi and the pressure P2 is in a range from about 8,000 psi to about 10,000 psi; the pressure P1 is in a range from about 9,500 psi to about 10,500 psi and the pressure P2 is in a range from about 8,500 psi to about 9,500 psi; and the pressure P1 is about 10,000 psi and the pressure P2 is about 9,000 psi. In other embodiments, the pressure P3 is in a range from about 10,000 psi to about 12,000 psi, the pressure P4 is in a range from about 8,000 psi to about 9,000 psi, the pressure P5 is in a range from about 9,500 psi to about 11,500 psi, the pressure P6 is in a range from about 8,000 psi to about 10,000 psi. In other examples, the pressure P3 is about 11,000 psi, the pressure P4 is about 8,500 psi, the pressure P5 is about 10,500 psi, and the pressure P6 is about 9,000 psi.

The flow rate of the micro-proppant slurry 110 (e.g., increased flow rate and/or decreased flow rate) and/or the pressure of the wellbore 90 (e.g., increased pressure or decreased pressure) are maintained for a period of time in a range from about 5 sec, about 10 sec, about 15 sec, about 20 sec, about 30 sec, about 40 sec, about 50 sec, or about 60 sec to about 90 sec, about 2 min, about 3 min, about 4 min, about 5 min, about 6 min, about 7 min, about 8 min, about 9 min, about 10 min, or longer. For example, the flow rate of the micro-proppant slurry 110 and/or the pressure of the wellbore 90 are maintained for a period of time in a range from about 5 sec to about 10 min, a range from about 10 sec to about 5 min, a range from about 10 sec to about 2 min, a range from about 5 sec to about 1 min, or a range from about 5 sec to less than 1 min.

In one or more examples, the increased flow rate is maintained for a period of time in a range from about 5 sec to about 10 min and the decreased flow rate of the micro-proppant slurry 110 is maintained for a period of time in a range from about 5 sec to about 10 min for the micro-proppant slurry 110 and/or the pressure of the wellbore 90. In some examples, the increased flow rate is maintained for a period of time in a range from about 10 sec to about 5 min and the decreased flow rate is maintained for a period of time in a range from about 10 sec to about 5 min for the micro-proppant slurry 110 and/or the pressure of the wellbore 90. In other examples, the increased flow rate is maintained for a period of time in a range from about 10 sec to about 2 min and the decreased flow rate is maintained for a period of time in a range from about 10 sec to about 2 min for the micro-proppant slurry 110 and/or the pressure of the wellbore 90. In other examples, the increased flow rate is maintained for a period of time in a range from about 5 sec to less than 1 min and the decreased flow rate is maintained for a period of time in a range from about 5 sec to less than 1 min for the micro-proppant slurry 110 and/or the pressure of the wellbore 90.

In one or more embodiments, sequentially increasing and decreasing flow rates of the micro-proppant slurry 110 in the wellbore 90 includes: increasing an initial flow rate of the micro-proppant slurry 110 to have a first increased flow rate for a first period, decreasing the first increased flow rate of the micro-proppant slurry 110 to have a first decreased flow rate for a second period, increasing the first decreased flow rate of the micro-proppant slurry 110 to have a second increased flow rate for a third period, and decreasing the second increased flow rate of the micro-proppant slurry 110 to have a second decreased flow rate for a fourth period. The first increased flow rate and the second increased flow rate are equal to each other and the first decreased flow rate and the second decreased flow rate are equal to each other. The first period and the third period are equal to each other and the second period and the fourth period are equal to each other. The first increased flow rate and the second increased flow rate are unequal to each other or the first decreased flow rate and the second decreased flow rate are unequal to each other. The first period and the third period are unequal to each other or the second period and the fourth period are unequal to each other.

In other embodiments, sequentially increasing and decreasing flow rates of the micro-proppant slurry 110 in the wellbore 90 include increasing the flow rate of the micro-proppant slurry 110 in the wellbore 90 to have an increased flow rate and decreasing the flow rate of the micro-proppant slurry 110 in the wellbore 90 to have a decreased flow rate. The micro-proppant is flowed into the far field secondary fractures 122 of the subterranean formation 104 by the increased flow rate. Also, the far field secondary fractures 122 are propped or substantially propped open with the micro-proppant by the decreased flow rate.

In some examples, sequentially increasing and decreasing flow rates of the micro-proppant slurry 110 in the wellbore 90 include increasing the flow rate of the micro-proppant slurry 110 to have a first increased flow rate greater than an initial flow rate, decreasing the flow rate of the micro-proppant slurry 110 to have a first decreased flow rate greater than the initial flow rate, increasing the flow rate of the micro-proppant slurry 110 to have a second increased flow rate greater than the initial flow rate, and decreasing the flow rate of the micro-proppant slurry 110 to have a second decreased flow rate greater than the initial flow rate.

The fracturing fluid and/or the micro-proppant slurry can include one or more additives. Exemplary additives can be or include, but are not limited to, one or more acids (e.g., HCl, HF, sulfuric acid, acetic acid, chlorous acid, citric acid), glutaraldehyde, sodium chloride, N,N-dimethylformamide (DMF), one or more borate salts, one or more polyacrylamides, petroleum distillates, guar gum and/or derivatives thereof, xanthan, potassium chloride, ammonium chloride, calcium chloride, ammonium persulfates, ammonium bisulfates, sodium persulfates, sodium carbonate, potassium carbonate, ethylene glycol, propylene glycol, ethanol, isopropanol, derivatives thereof, salts thereof, or any mixture thereof.

The micro-proppant slurry has a concentration of about 0.25 pounds/gallon (ppg) (about 30 g/L) or less, such as, about 0.2 ppg (about 24 g/L), about 0.15 ppg (about 18 g/L), about 0.1 ppg (about 12 g/L), about 0.05 ppg (about 6 g/L), about 0.01 ppg (about 1.2 g/L), about 0.001 ppg (about 0.12 g/L), or less of the micro-proppant in the fracturing fluid. For example, the micro-proppant slurry has a concentration of about 0.2 ppg, about 0.1 ppg, or less of the micro-proppant in the fracturing fluid. In other examples, the micro-proppant slurry has a concentration in a range from about 0.001 pounds/gallon (ppg) (about 0.12 g/L), about 0.01 ppg (about 1.2 g/L), or about 0.05 ppg (about 6 g/L) to about 0.1 ppg (about 12 g/L), about 0.15 ppg (about 18 g/L), about 0.2 ppg (about 24 g/L), or more of the micro-proppant in the fracturing fluid. For example, the micro-proppant slurry has a concentration in a range from about 0.01 ppg to about 0.1 ppg of the micro-proppant in the fracturing fluid. In one or more embodiments, the micro-proppant slurry 110 is pumped or introduced into the wellbore 90 at a concentration equal to or less than the critical bridging concentration of the micro-proppant in the subterranean formation 104.

The micro-proppant has an average particle size of 150 micrometers (μm) (100 mesh) or less, such as, in a range from about 140 μm, about 130 μm, about 125 μm (120 mesh), about 106 μm (140 mesh), or about 100 μm to about 90 μm (170 mesh), about 75 μm (200 mesh), about 63 μm (230 mesh), about 53 μm (270 mesh), about 50 μm, about 45 μm (325 mesh), about 40 μm, about 38 μm (400 mesh), about 30 μm, about 20 μm, about 10 μm, about 5 μm, about 2 μm, about 1 μm, or less. For example, the micro-proppant has an average particle size in a range from about 1 μm to 150 μm, a range from about 1 μm to about 130 μm, a range from about 1 μm to about 100 μm, a range from about 20 μm to 150 μm, a range from about 20 μm to about 130 μm, a range from about 20 μm to about 100 μm, a range from about 20 μm to about 50 μm, a range from about 1 μm to less than 150 μm, a range from about 1 μm to less than 130 μm, a range from about 1 μm to less than 100 μm, a range from about 20 μm to 150 μm, a range from about 20 μm to less than 130 μm, a range from about 20 μm to less than 100 μm, or a range from about 20 μm to less than 50 μm.

The micro-proppant can be, include, or contain, but is not limited to one or more silicates, one or more silicas, one or more aluminates, one or more aluminas, one or more aluminum silicates, one or more types of sand, one or more ceramics, hydrates thereof, or any mixture thereof. In some examples, the micro-proppant can be, include, or contain, but is not limited to, calcium carbonate, barium sulfate, hydrates thereof, salts thereof, or any mixture thereof. The micro-proppant can be or include, but is not limited to, one or more of: ceramic microspheres or particles, polymeric microspheres or particles, resin microspheres or particles, fly ash, cellulosic whiskers, glass whiskers, or any mixture thereof. In some examples, the micro-proppant can be or include, but is not limited to, one or more spray dried polymeric materials, furan resin particles, epoxy resin particles, or mixture thereof.

In one or more embodiments, the fracturing fluid and the micro-proppant are mixed or otherwise combined to produce the micro-proppant slurry 110 outside of the wellbore 90. In another embodiment, the micro-proppant is synthesized, made, formed, or otherwise produced in the fracturing fluid outside of the wellbore 90. Alternatively, the micro-proppant is synthesized, made, formed, or otherwise produced in the fracturing fluid inside of the wellbore 90, such as within one or more near field primary fractures 120 and/or one or more far field secondary fractures 122 within the fracture system 118.

In one or more examples, the micro-proppant is produced by hydrolyzing organic silicate in the fracturing fluid, such as by changing the pH of the fracturing fluid outside and/or inside of the wellbore 90. In other examples, the micro-proppant is produced by hydrolyzing aluminoxane in the fracturing fluid outside and/or inside of the wellbore 90. In other examples, the micro-proppant is produced in the fracturing fluid outside and/or inside of the wellbore 90 by a method that includes mixing or combining calcium oxide (CaO) and carbon dioxide in an aqueous solution to form calcium carbonate ($CaCO_3$) and/or mixing or combining barium carbonate ($BaCO_3$) and sulfuric acid to form barium sulfate ($BaSO_4$).

In one or more examples, the micro-proppant is produced in the fracturing fluid outside and/or inside of the wellbore 90 by a method that includes heating an emulsion of monomer and cross-linker in the fracturing fluid to generate polymeric particles. In other examples, the micro-proppant is produced in the fracturing fluid outside and/or inside of the wellbore 90 by a method that includes combining an emulsion of furfural in an aqueous solution with an acid to form furan resin particles. In some examples, the micro-proppant is produced in the fracturing fluid outside and/or inside of the wellbore 90 by a method that includes combining an emulsion of epoxy resin in an aqueous solution with a hardener and heating the combination to form epoxy resin particles.

In one or more embodiments, the method also includes flowing, pumping, or otherwise introducing one or more macro-proppant slurries into the near field primary fractures 120 of the subterranean formation 104. The macro-proppant slurry is flowed, pumped, or otherwise introduced into the near field primary fracture 120 before, during, and/or after flowing, pumping, or otherwise introducing one or more micro-proppant slurries into the near field primary fracture 120.

One or more macro-proppants and one or more fracturing fluids are mixed or otherwise combined to form or produce the macro-proppant slurry. The macro-proppant has an average particle size of greater than 150 μm, such as in a range from about 160 μm, about 180 μm, about 200 μm, about 250 μm, or about 500 μm to about 600 μm, about 800 μm, about 1 mm, less than 2 mm, about 2 mm, about 3 mm, about 4 mm, about 5 mm, or larger. For example, the macro-proppant has an average particle size in a range of greater than 150 μm to about 5 mm, a range from about 160 μm to about 5 mm, a range from about 180 μm to about 5 mm, a range from about 200 μm to about 5 mm, a range from about 200 μm to about 3 mm, a range from about 200 μm to less than 2 mm, or a range from about 250 μm to about 1 mm.

In one or more examples, the macro-proppant and the micro-proppant are pumped into the wellbore 90 and added to the fracturing fluid by a single-stage fracturing treatment. For example, the macro-proppant and the micro-proppant are flowed, pumped, or otherwise introduced together or simultaneously into the wellbore 90 during the single-stage fracturing treatment. In other examples, the macro-proppant and the micro-proppant are pumped into the wellbore 90 and added to the fracturing fluid by a multi-stage fracturing treatment. For example, the micro-proppant is introduced into the wellbore 90 and added to the fracturing fluid in a first stage or initial pad stage of the multi-stage fracturing treatment, and the macro-proppant is introduced into the wellbore 90 and added to the fracturing fluid in a second stage of the multi-stage fracturing treatment. Alternatively, the macro-proppant is introduced into the wellbore 90 and added to the fracturing fluid in a first stage of the multi-stage fracturing treatment, and the micro-proppant is introduced into the wellbore 90 and added to the fracturing fluid in a second stage of the multi-stage fracturing treatment.

In one or more embodiments, the method for fracturing the subterranean formation 104 includes pumping the micro-proppant slurry 110 into the wellbore 90 located in the subterranean formation 104, increasing the flow rate of the micro-proppant slurry 110 in the wellbore 90 and flowing the micro-proppant into the far field secondary fractures 122 of the subterranean formation 104, then decreasing the flow rate of the micro-proppant slurry 110 in the wellbore 90 and substantially propping the far field secondary fractures 122 open with the micro-proppant, and repeating the increasing and decreasing of the flow rates of the micro-proppant slurry 110 in the wellbore 90 to propagate the far field secondary fractures 122 within the subterranean formation 104.

In one or more embodiments, the method for fracturing the subterranean formation 104 includes pumping the fracturing fluid into the wellbore 90 located in the subterranean formation 104, fracturing the subterranean formation 104 with the fracturing fluid to form near field primary fractures 120 and far field secondary fractures 122, and pumping the micro-proppant slurry 110 can include the micro-proppant and the fracturing fluid into the wellbore 90. The method also includes sequentially increasing and decreasing flow rates of the micro-proppant slurry 110 in the wellbore 90 during two or more stress treatment cycles, flowing the micro-proppant into the far field secondary fractures 122 of the subterranean formation 104 when increasing the flow rate of the micro-proppant slurry 110 in the wellbore 90, propping the far field secondary fractures 122 open with the micro-proppant when decreasing the flow rate of the micro-proppant slurry 110 in the wellbore 90, and propagating the far field secondary fractures 122 within the subterranean formation 104 by increasing lengths of the far field secondary fractures 122, increasing sectional areas of the far field secondary fractures 122, forming additional far field secondary fractures 122, or any combination thereof.

In one or more embodiments, the method for fracturing the subterranean formation 104 includes pumping the micro-proppant slurry 110 into the wellbore 90 located in the subterranean formation 104, sequentially increasing and decreasing flow rates of the micro-proppant slurry 110 in the wellbore 90 during two or more stress treatment cycles, flowing the micro-proppant into the far field secondary fractures 122 when increasing the flow rate of the micro-proppant slurry 110, and propping the far field secondary fractures 122 open with the micro-proppant when decreasing the flow rate of the micro-proppant slurry 110.

In addition to the embodiments described above, embodiments of the present disclosure further relate to one or more of the following paragraphs:

1. A method for fracturing a subterranean formation, comprising: pumping a micro-proppant slurry into a wellbore located in the subterranean formation, wherein the micro-proppant slurry comprises a fracturing fluid and a micro-proppant having an average particle size of 150 μm or less, and wherein the subterranean formation comprises near field primary fractures and far field secondary fractures; and sequentially increasing and decreasing flow rates of the micro-proppant slurry in the wellbore and propagating the far field secondary fractures within the subterranean formation during two or more stress treatment cycles, wherein each stress treatment cycle comprises increasing and decreasing the flow rate of the micro-proppant slurry in the wellbore.

2. A method for fracturing a subterranean formation, comprising: pumping a micro-proppant slurry into a wellbore located in the subterranean formation, wherein the micro-proppant slurry comprises a fracturing fluid and a micro-proppant having an average particle size of 150 μm or less, and wherein the subterranean formation comprises near field primary fractures and far field secondary fractures; increasing the flow rate of the micro-proppant slurry in the wellbore and flowing the micro-proppant into the far field secondary fractures of the subterranean formation; then decreasing the flow rate of the micro-proppant slurry in the wellbore and substantially propping the far field secondary fractures open with the micro-proppant; and repeating the increasing and decreasing of the flow rates of the micro-proppant slurry in the wellbore to propagate the far field secondary fractures within the subterranean formation.

3. A method for fracturing a subterranean formation, comprising: pumping a fracturing fluid into a wellbore located in the subterranean formation; fracturing the subterranean formation with the fracturing fluid to form near field primary fractures and far field secondary fractures; pumping a micro-proppant slurry comprising a micro-proppant and the fracturing fluid into the wellbore, wherein an average particle size of the micro-proppant is 150 μm or less; sequentially increasing and decreasing flow rates of the micro-proppant slurry in the wellbore to perform two or more stress treatment cycles; flowing the micro-proppant into the far field secondary fractures when increasing the flow rate of the micro-proppant slurry in the wellbore; propping the far field secondary fractures open with the micro-proppant when decreasing the flow rate of the micro-proppant slurry in the wellbore; and propagating the far field secondary fractures by increasing lengths of the far field secondary fractures, increasing sectional areas of the far field secondary fractures, forming additional far field secondary fractures, or any combination thereof.

4. A method for fracturing a subterranean formation, comprising: pumping a micro-proppant slurry into a wellbore located in the subterranean formation, wherein the micro-proppant slurry comprises a fracturing fluid and a micro-proppant having an average particle size of 150 μm or less, and wherein the subterranean formation comprises near field primary fractures and far field secondary fractures; sequentially increasing and decreasing flow rates of the micro-proppant slurry in the wellbore during two or more stress treatment cycles; flowing the micro-proppant into the far field secondary fractures when increasing the flow rate of the micro-proppant slurry; and propping the far field secondary fractures with the micro-proppant when decreasing the flow rate of the micro-proppant slurry.

5. The method according to any one of paragraphs 1-4, wherein propagating the far field secondary fractures further comprises increasing lengths of the far field secondary fractures, increasing sectional areas of the far field secondary fractures, forming additional far field secondary fractures, or any combination thereof.

6. The method according to any one of paragraphs 1-5, wherein each stress treatment cycle comprises; flowing the micro-proppant into the far field secondary fractures when increasing the flow rate of the micro-proppant slurry; and propping the far field secondary fractures open with the micro-proppant when decreasing the flow rate of the micro-proppant slurry.

7. The method according to any one of paragraphs 1-6, wherein the stress treatment cycle is conducted in a range from 2 times to about 300 times.

8. The method according to any one of paragraphs 1-7, wherein the stress treatment cycle is conducted in a range from 3 times to about 100 times.

9. The method according to any one of paragraphs 1-8, wherein the flow rate of the micro-proppant slurry in the wellbore is in a range from about 10 barrels per minute (bpm) to about 200 bpm.

10. The method according to any one of paragraphs 1-9, wherein the flow rate of the micro-proppant slurry in the wellbore is in a range from about 20 bpm to about 100 bpm.

11. The method according to any one of paragraphs 1-10, wherein the increased flow rate of the micro-proppant slurry is maintained for a period of time in a range from about 5 seconds to about 10 minutes, and wherein the decreased flow rate of the micro-proppant slurry is maintained for a period of time in a range from about 5 seconds to about 10 minutes.

12. The method according to any one of paragraphs 1-11, wherein the increased flow rate of the micro-proppant slurry is maintained for a period of time in a range from about 10 seconds to about 5 minutes, and wherein the decreased flow rate of the micro-proppant slurry is maintained for a period of time in a range from about 10 seconds to about 5 minutes.

13. The method according to any one of paragraphs 1-12, wherein the increased flow rate of the micro-proppant slurry is maintained for a period of time in a range from about 10 seconds to about 2 minutes, and wherein the decreased flow rate of the micro-proppant slurry is maintained for a period of time in a range from about 10 seconds to about 2 minutes.

14. The method according to any one of paragraphs 1-13, wherein the increased flow rate of the micro-proppant slurry is maintained for a period of time in a range from about 5 seconds to less than 1 minute, and wherein the decreased flow rate of the micro-proppant slurry is maintained for a period of time in a range from about 5 seconds to less than 1 minute.

15. The method according to any one of paragraphs 1-14, wherein a pressure of the wellbore is in a range from about 500 psi to about 15,000 psi.

16. The method according to any one of paragraphs 1-15, wherein prior to pumping the micro-proppant slurry into the wellbore, the method further comprises: pumping the fracturing fluid without the micro-proppant into the wellbore; and fracturing the subterranean formation with the fracturing fluid to form the near field primary fractures and the far field secondary fractures.

17. The method of paragraph 16, further comprising mixing the fracturing fluid and the micro-proppant to produce the micro-proppant slurry outside of the wellbore.

18. The method according to any one of paragraphs 1-17, further comprising producing the micro-proppant in the fracturing fluid outside of the wellbore.

19. The method according to any one of paragraphs 1-18, wherein sequentially increasing and decreasing flow rates of the micro-proppant slurry in the wellbore further comprises: increasing an initial flow rate of the micro-proppant slurry to have a first increased flow rate for a first period; decreasing the first increased flow rate of the micro-proppant slurry to have a first decreased flow rate for a second period; increasing the first decreased flow rate of the micro-proppant slurry to have a second increased flow rate for a third period; and decreasing the second increased flow rate of the micro-proppant slurry to have a second decreased flow rate for a fourth period.

20. The method of paragraph 19, wherein the first increased flow rate and the second increased flow rate are equal to each other and the first decreased flow rate and the second decreased flow rate are equal to each other.

21. The method of paragraph 20, wherein the first period and the third period are equal to each other and the second period and the fourth period are equal to each other.

22. The method of paragraph 19, wherein the first increased flow rate and the second increased flow rate are unequal to each other or the first decreased flow rate and the second decreased flow rate are unequal to each other.

23. The method of paragraph 22, wherein the first period and the third period are unequal to each other or the second period and the fourth period are unequal to each other.

24. The method according to any one of paragraphs 1-23, wherein sequentially increasing and decreasing flow rates of the micro-proppant slurry in the wellbore further comprises: increasing the flow rate of the micro-proppant slurry in the wellbore to have an increased flow rate; and decreasing the flow rate of the micro-proppant slurry in the wellbore to have a decreased flow rate.

25. The method of paragraph 24, wherein the micro-proppant flow into the far field secondary fractures of the subterranean formation by the increased flow rate, and wherein the far field secondary fractures are propped with the micro-proppant by the decreased flow rate.

26. The method according to any one of paragraphs 1-25, wherein sequentially increasing and decreasing flow rates of the micro-proppant slurry in the wellbore further comprises: increasing the flow rate of the micro-proppant slurry to have a first increased flow rate greater than an initial flow rate; decreasing the flow rate of the micro-proppant slurry to have a first decreased flow rate greater than the initial flow rate; increasing the flow rate of the micro-proppant slurry to have a second increased flow rate greater than the initial flow rate; and decreasing the flow rate of the micro-proppant slurry to have a second decreased flow rate greater than the initial flow rate.

27. The method according to any one of paragraphs 1-26, wherein the micro-proppant slurry has a concentration of about 0.2 pounds/gallon (about 24 g/L) or less of the micro-proppant.

28. The method according to any one of paragraphs 1-27, wherein the micro-proppant slurry has a concentration of about 0.1 pounds/gallon (about 12 g/L) or less of the micro-proppant.

29. The method according to any one of paragraphs 1-28, wherein the micro-proppant slurry has a concentration in a range from about 0.01 pounds/gallon (about 1.2 g/L) to about 0.1 pounds/gallon (about 12 g/L) of the micro-proppant.

30. The method according to any one of paragraphs 1-29, wherein an average particle size of the micro-proppant is in a range from about 1 μm to about 130 μm.

31. The method according to any one of paragraphs 1-30, wherein an average particle size of the micro-proppant is in a range from about 20 μm to about 100 μm.

32. The method according to any one of paragraphs 1-31, wherein the micro-proppant comprises silicate, silica, aluminate, alumina, aluminum silicate, sand, a ceramic, hydrates thereof, or any mixture thereof.

33. The method according to any one of paragraphs 1-32, wherein the micro-proppant comprises ceramic microspheres or particles, polymeric microspheres or particles, resin microspheres or particles, fly ash, cellulosic whiskers, glass whiskers, or any mixture thereof.

34. The method according to any one of paragraphs 1-33, wherein the micro-proppant comprises calcium carbonate, barium sulfate, hydrates thereof, salts thereof, or any mixture thereof.

35. The method according to any one of paragraphs 1-34, further comprising: mixing a macro-proppant and the fracturing fluid to produce a macro-proppant slurry, wherein an average particle size of the macro-proppant is greater than 150 μm; and flowing the macro-proppant with the fracturing fluid into the near field primary fractures of the subterranean formation.

36. The method of paragraph 35, wherein an average particle size of the macro-proppant is in a range from greater than 150 μm to about 5 mm.

37. The method of paragraph 35, wherein an average particle size of the macro-proppant is in a range from about 200 μm to about 3 mm.

38. The method of paragraph 35, wherein an average particle size of the macro-proppant is in a range from about 200 μm to less than 2 mm.

39. The method of paragraph 35, wherein the macro-proppant and the micro-proppant are pumped into the wellbore in the fracturing fluid in a single-stage fracturing treatment.

40. The method of paragraph 35, wherein the macro-proppant and the micro-proppant are pumped into the wellbore in the fracturing fluid in a multi-stage fracturing treatment.

41. The method of paragraph 40, wherein the macro-proppant is pumped into the wellbore in the fracturing fluid in a first stage of the multi-stage fracturing treatment, and the micro-proppant is pumped into the wellbore in the fracturing fluid in a second stage of the multi-stage fracturing treatment.

42. The method of paragraph 40, wherein the macro-proppant is pumped into the wellbore in the fracturing fluid in a first stage of the multi-stage fracturing treatment, and the micro-proppant is pumped into the wellbore in the fracturing fluid in a second stage of the multi-stage fracturing treatment.

43. The method according to any one of paragraphs 1-42, wherein fracturing the subterranean formation comprises fracturing a low permeability zone having a permeability of 1 millidarcy (mD) or less with the fracturing fluid.

44. The method according to any one of paragraphs 1-43, wherein fracturing the subterranean formation comprises fracturing a shale zone with the fracturing fluid.

45. The method according to any one of paragraphs 1-44, further comprising pumping the micro-proppant slurry into the wellbore at a concentration equal to or less than the critical bridging concentration of the micro-proppant in the subterranean formation.

46. The method according to any one of paragraphs 1-45, wherein propping the far field secondary fractures with the micro-proppant comprises propping dendritic fractures substantially with the micro-proppant.

47. The method according to any one of paragraphs 1-46, wherein the micro-proppant slurry is introduced into the wellbore by use of a pump.

This discussion is directed to various embodiments of the invention. The drawing figures are not necessarily to scale. Certain features of the embodiments can be shown exaggerated in scale or in somewhat schematic form and some details of conventional elements may not be shown in the interest of clarity and conciseness. Although one or more of these embodiments can be preferred, the embodiments disclosed should not be interpreted, or otherwise used, as limiting the scope of the disclosure, including the claims. It is to be fully recognized that the different teachings of the embodiments discussed can be employed separately or in any suitable combination to produce desired results. In addition, one skilled in the art will understand that the description has broad application, and the discussion of any embodiment is meant only to be exemplary of that embodiment, and not intended to intimate that the scope of the disclosure, including the claims, is limited to that embodiment.

Within this document, a reference identifier can be used as a general label, for example "101," for a type of element and alternately used to indicate a specific instance or characterization, for example "101A" and 101B," of that same type of element.

Certain terms are used throughout the description and claims to refer to particular features or components. As one skilled in the art will appreciate, different persons may refer to the same feature or component by different names. This document does not intend to distinguish between components or features that differ in name but not function, unless specifically stated. In the discussion and in the claims, the terms "including" and "comprising" are used in an open-ended fashion, and thus should be interpreted to mean "including, but not limited to . . . ." Also, the term "couple" or "couples" is intended to mean either an indirect or direct connection. The use of "top," "bottom," "above," "below," and variations of these terms is made for convenience, but does not require any particular orientation of the components.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Reference throughout this specification to "one embodiment," "an embodiment," or similar language means that a particular feature, structure, or characteristic described in connection with the embodiment can be included in at least one embodiment of the present disclosure. Thus, appearances of the phrases "in one embodiment," "in an embodiment," and similar language throughout this specification may, but do not necessarily, all refer to the same embodiment.

Although the present invention has been described with respect to specific details, it is not intended that such details should be regarded as limitations on the scope of the invention, except to the extent that they are included in the accompanying claims.

What is claimed is:

1. A method for fracturing and stimulating a subterranean formation, comprising:
   pumping a micro-proppant slurry into a wellbore located in the subterranean formation, wherein the micro-proppant slurry comprises a fracturing fluid and a micro-proppant having an average particle size of 150 micrometers ($\mu$m) or less, and wherein the subterranean formation comprises near field primary fractures and far field secondary fractures; and
   sequentially increasing and decreasing flow rates of the micro-proppant slurry into the formation in two or more stress treatment cycles to cycle expansion and contraction of the subterranean formation and increase the likelihood of failure in the subterranean formation due to fatigue and propagate the far field secondary fractures within the subterranean formation, wherein each treatment cycle comprises flowing the micro-proppant into the secondary fractures when increasing the flow rate of the slurry and the propping the secondary fractures open with the micro-proppant when decreasing the flow rate of the micro-proppant slurry.

2. The method of claim 1, wherein propagating the far field secondary fractures further comprises increasing lengths of the far field secondary fractures, increasing sectional areas of the far field secondary fractures, forming additional far field secondary fractures, or any combination thereof.

3. The method of claim 1, wherein the stress treatment cycle is conducted in a range of 2 times to about 300 times.

4. The method of claim 1, wherein the flow rate of the micro-proppant slurry in the wellbore is in a range from about 20 barrels per minute (bpm) to about 100 bpm.

5. The method of claim 1, wherein the increased flow rate of the micro-proppant slurry is maintained for a period of time in a range from about 5 seconds to about 10 minutes, and wherein the decreased flow rate of the micro-proppant slurry is maintained for a period of time in a range from about 5 seconds to about 10 minutes.

6. The method of claim 1, wherein the increased flow rate of the micro-proppant slurry is maintained for a period of time in a range from about 10 seconds to about 2 minutes, and wherein the decreased flow rate of the micro-proppant slurry is maintained for a period of time in a range from about 10 seconds to about 2 minutes.

7. The method of claim 1, wherein prior to pumping the micro-proppant slurry into the wellbore, the method further comprises:
   pumping the fracturing fluid without the micro-proppant into the wellbore; and
   fracturing the subterranean formation with the fracturing fluid to form the near field primary fractures and the far field secondary fractures.

8. The method of claim 7, further comprising mixing the fracturing fluid and the micro-proppant to produce the micro-proppant slurry outside of the wellbore.

9. The method of claim 1, wherein sequentially increasing and decreasing flow rates of the micro-proppant slurry in the wellbore further comprises:
   increasing an initial flow rate of the micro-proppant slurry to have a first increased flow rate for a first period;

decreasing the first increased flow rate of the micro-proppant slurry to have a first decreased flow rate for a second period;

increasing the first decreased flow rate of the micro-proppant slurry to have a second increased flow rate for a third period; and decreasing the second increased flow rate of the micro-proppant slurry to have a second decreased flow rate for a fourth period.

10. The method of claim 9, wherein the first increased flow rate and the second increased flow rate are equal to each other and the first decreased flow rate and the second decreased flow rate are equal to each other.

11. The method of claim 10, wherein the first period and the third period are equal to each other and the second period and the fourth period are equal to each other.

12. The method of claim 9, wherein the first increased flow rate and the second increased flow rate are unequal to each other or the first decreased flow rate and the second decreased flow rate are unequal to each other.

13. The method of claim 12, wherein the first period and the third period are unequal to each other or the second period and the fourth period are unequal to each other.

14. The method of claim 1, wherein the micro-proppant slurry has a concentration in a range from about 0.2 pounds/gallon (about 24 g/L) or less of the micro-proppant.

15. The method of claim 1, wherein an average particle size of the micro-proppant is in a range from about 1 μm to about 130 μm.

16. The method of claim 1, wherein the micro-proppant comprises silicate, silica, aluminate, alumina, aluminum silicate, sand, a ceramic, hydrates thereof, or any mixture thereof.

17. The method of claim 1, wherein the micro-proppant comprises ceramic microspheres or particles, polymeric microspheres or particles, resin microspheres or particles, fly ash, cellulosic whiskers, glass whiskers, or any mixture thereof.

18. The method of claim 1, wherein the micro-proppant slurry is introduced into the wellbore by use of a pump.

19. A method for fracturing and stimulating a subterranean formation, comprising:

pumping a micro-proppant slurry into a wellbore located in the subterranean formation, wherein the micro-proppant slurry comprises a fracturing fluid and a micro-proppant having an average particle size of 150 micrometers (μm) or less, and wherein the subterranean formation comprises near field primary fractures and far field secondary fractures;

increasing the flow rate of the micro-proppant slurry into the formation and flowing the micro-proppant into the far field secondary fractures of the subterranean formation; then decreasing the flow rate of the micro-proppant slurry into the formation and substantially propping the far field secondary fractures open with the micro-proppant; and repeating the increasing and decreasing of the flow rates of the micro-proppant slurry into the formation in two or more stress treatment cycles to cycle expansion and contraction of the formation due to fatigue and propagate the far field secondary fractures within the subterranean formation.

20. The method of claim 19, the method further comprises, prior to pumping the micro-proppant slurry into the wellbore, pumping the fracturing fluid without the micro-proppant into the wellbore and fracturing the subterranean formation with the fracturing fluid to form the near field primary fractures and the far field secondary fractures.

* * * * *